United States Patent [19]

Inobe

[11] Patent Number: 5,212,020
[45] Date of Patent: May 18, 1993

[54] BATTERY CASE

[75] Inventor: Kazuhiko Inobe, Yokohama, Japan

[73] Assignee: Matsushita Electric Industrial Co., Ltd., Osaka, Japan

[21] Appl. No.: 769,376

[22] Filed: Oct. 1, 1991

[30] Foreign Application Priority Data

Oct. 4, 1990 [JP] Japan .................. 2-267682

[51] Int. Cl.⁵ .................................. H01M 2/00
[52] U.S. Cl. .......................... 429/9; 429/96; 429/123
[58] Field of Search ............. 429/9, 1, 163, 96, 100, 429/123, 121, 176; 206/333; 307/150; 439/500

[56] References Cited

U.S. PATENT DOCUMENTS

| Re. 28,948 | 8/1976 | Kaye | 429/1 |
| 4,205,121 | 5/1980 | Naitoh | 429/99 |
| 4,206,274 | 6/1980 | Peels | 429/99 |
| 4,389,469 | 6/1983 | Nicholls | 429/100 X |
| 4,752,539 | 6/1988 | Vatter | 429/1 |
| 4,969,206 | 11/1990 | Desrochers | 429/1 X |
| 5,015,546 | 5/1991 | Dulaney et al. | 429/99 |

Primary Examiner—Anthony Skapars
Attorney, Agent, or Firm—Stevens, Davis, Miller & Mosher

[57] ABSTRACT

A battery case has a storage space formed for selectively accommodating a battery pack or a plurality of primary batteries so that the batteries can be selectively used as a power source by employing minus and plus external terminals respectively connected to minus and plus terminals corresponding to the batteries. In addition, since the minus and plus external terminals are disposed at the same positions as those of the minus and plus external terminals provided on a storage battery case, the battery case of the invention can be selectively used.

4 Claims, 5 Drawing Sheets

BATTERY CASE

BACKGROUND OF THE INVENTION

The present invention relates to a battery case for receiving batteries used as a power source for portable data input processors such as portable terminal devices and the like.

Such portable terminal devices generally use as a power source a storage battery. An example of conventional terminal devices provided with a storage battery is described below with reference to FIG. 1.

As shown in FIG. 1, a portable terminal device body (referred to as "body" hereinafter) 51 has a recessed portion 52 formed therein. Engaging holes 54 are formed at both ends of one short side 53 in the recessed portion 52, and minus terminals 56 and two plus terminals 57 are provided at both ends of the other short side 55 in the recessed portion 52. The body 51 has a connecting recessed portion 58 formed at the opening-side end of the recessed portion 52 on the side of the short side 55 thereof, and a screw hole 59 formed at the center of the bottom of the connecting recessed portion 58.

On the other hand, a storage battery 60 has engaging protrusions 63 provided at both ends of one short side 62 of a case 61 and a minus external terminal 65 and a plus external terminal 66 both of which are connected to secondary batteries (not shown) contained in the case 61 and which are provided at both ends of the other short side 64. The case 61 has a connecting protrusion 67 which is provided at the external side edge of the short side 64 and an attaching screw 68 which is supported by being passed through a screw through hole of the connecting protrusion 67.

The operation of attaching the battery 60 in the above arrangement is described below.

The engaging protrusion 63 of the case 61 is first engaged with the engaging hole 54 on the side of the body 51. The case 61 is then rotated around the engagement portion serving as a fulcrum so as to be accommodated in the recessed portion 52 on the side of the body 51, and the connecting protrusion 67 is engaged with the connecting recessed portion 58. This brings about the contact of the minus and the plus external terminals 65 and 66 of the storage battery 60 with the minus and plus external terminals 56 and 57 on the side of the body 51. The attaching screw 68 supported by the screw through hole of the connecting protrusion 67 on the side of the storage battery 60 is then screwed into the screw hole 59 on the side of the body 51 so that the storage battery 60 can be attached to the body 51.

Conversely, the attaching screw 68 is loosened, and the case 61 is rotated around the engagement portion between the engaging protrusion 63 and the engaging hole 54, which portion serves as a fulcrum, so that the connecting protrusion 67 of the storage battery 60 is separated from the recessed portion 52 on the side of the body 51. The engaging protrusion 63 is then separated from the engaging hole 54 so that the storage battery 60 can be separated from the body 51.

There have recently been demands for the possibility of selective use, as a power source for a portable terminal device, of the above storage battery or a single-cell primary battery such as an alkali battery for the purpose of increasing the capacity and decreasing the weight of the device. There have also been demands for the possibility of selective use of a storage battery when a primary battery is used as a power source and the possibility of selective use of different types of nickel-hydrogen batteries or batteries such as lithium secondary batteries or the like, which are newly developed and have new characteristics, other than the alkali battery. However, the battery used as a power source for the conventional portable terminal device is limited to a storage battery or a primary battery.

SUMMARY OF THE INVENTION

The present invention has been achieved for solving the above problem of conventional terminal devices, and it is an object of the present invention to provide a battery case which allows the selective use of a storage battery or a primary battery so that an attempt can be made to make the use of an electronic apparatus convenient.

In order to achieve the object, the present invention provides a battery case which can be attached to the body of an electronic apparatus and which is formed so as to have the same outside dimensions as those of a storage battery case, the battery case comprising a space formed for selectively storing a battery pack or a plurality of primary batteries, attaching means formed so as to be the same as that of the storage battery case for the purpose of attaching the case to the body of the electronic apparatus, minus and plus terminals which are disposed in the case so that a plurality of primary batteries accommodated in the storage space are connected to one another, a plus terminal disposed so as to contact with the plus terminal of the battery pack, and minus and plus external terminals which are respectively connected to a minus terminal among the above minus terminals, which contacts with the minus terminal of the battery pack so as to be also used for the battery pack, the plus terminals for the primary batteries and the plus terminal for the battery pack, and which are provided at the same positions as those of the minus and plus external terminals of the storage battery.

In the present invention, therefore, the primary batteries or the battery pack containing secondary batteries is selectively accommodated in the storage space of the case so that they can be used as a power source by employing the minus and plus external terminals respectively connected tot he minus and plus terminals corresponding to the batteries. In addition, since the minus and plus external terminals are disposed at the same positions as those of the minus and plus external terminals provided on the storage battery case, the battery case can be selectively used.

BRIEF DESCRIPTION OF THE DRAWINGS

FIGS. 2 to 4 are drawings showing a battery case in accordance with an embodiment of the present invention, in which FIG. 2 is a plan view showing the state where an upper case is removed, FIG. 3 is a sectional view taken along the line III—III in FIG. 2 and FIG. 4 is a perspective view showing plus terminals for a battery pack;

FIGS. 5A to 5D show an example of battery packs, in which FIG. 5A is a plan view, FIG. 5B is a front view, FIG. 5C is a bottom view, and FIG. 5D is a side view.

DESCRIPTION OF THE INVENTION

An embodiment of the present invention is described below with reference to the drawings.

Figure 2:
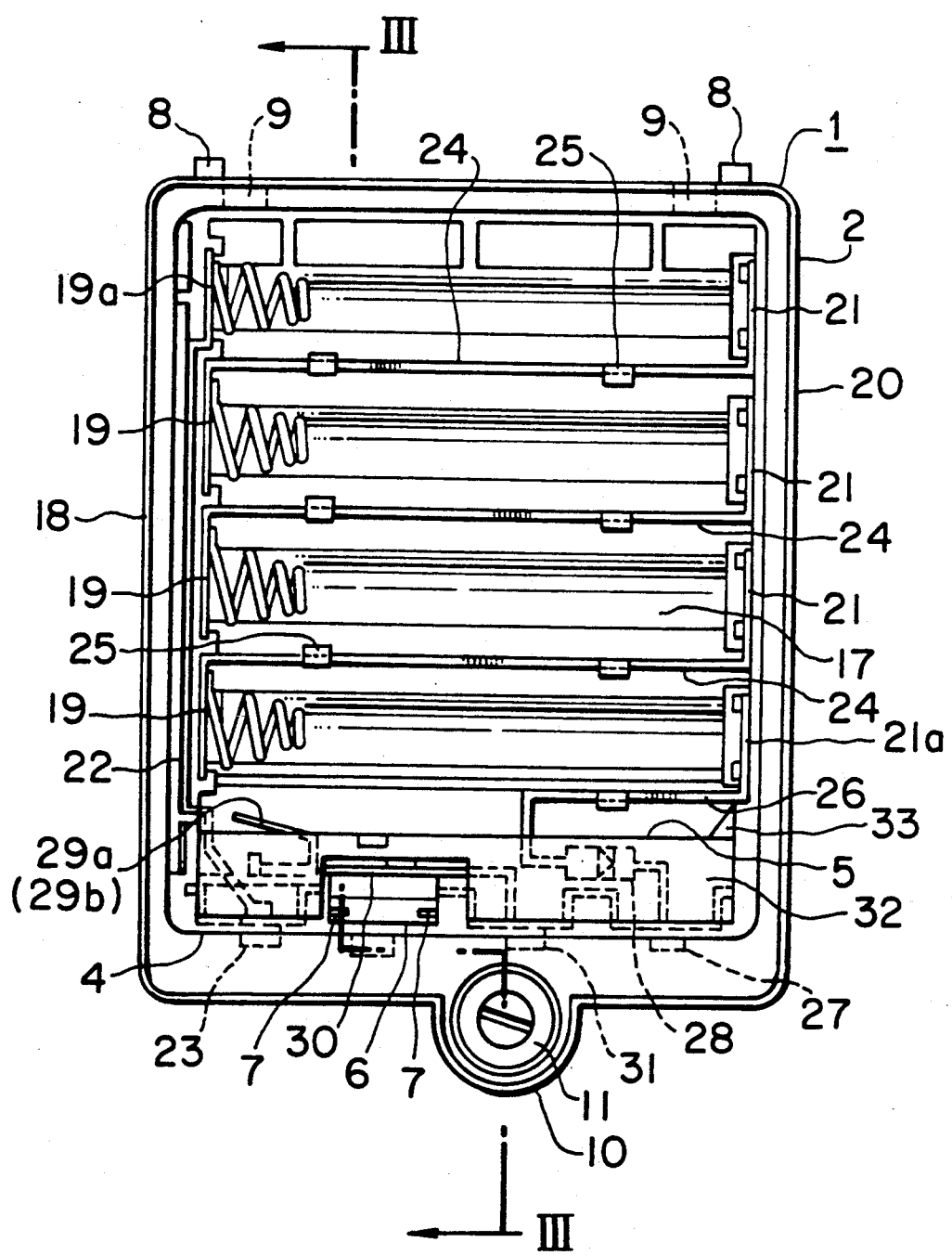
Figure 3:
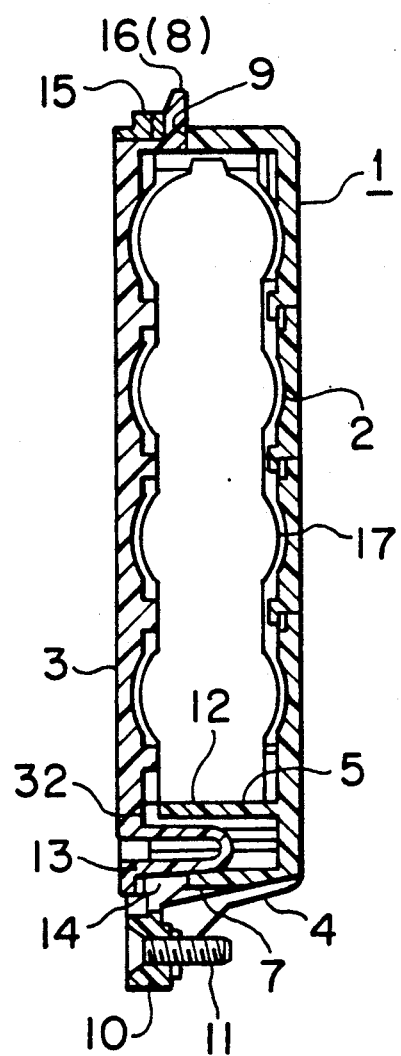
Figure 4:
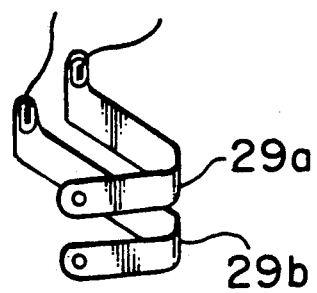
Figure 5A:
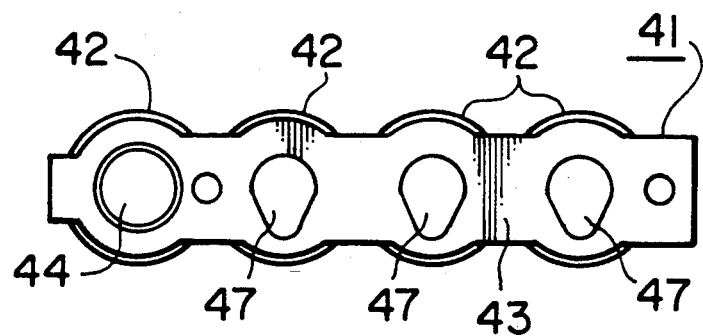
Figure 5B:
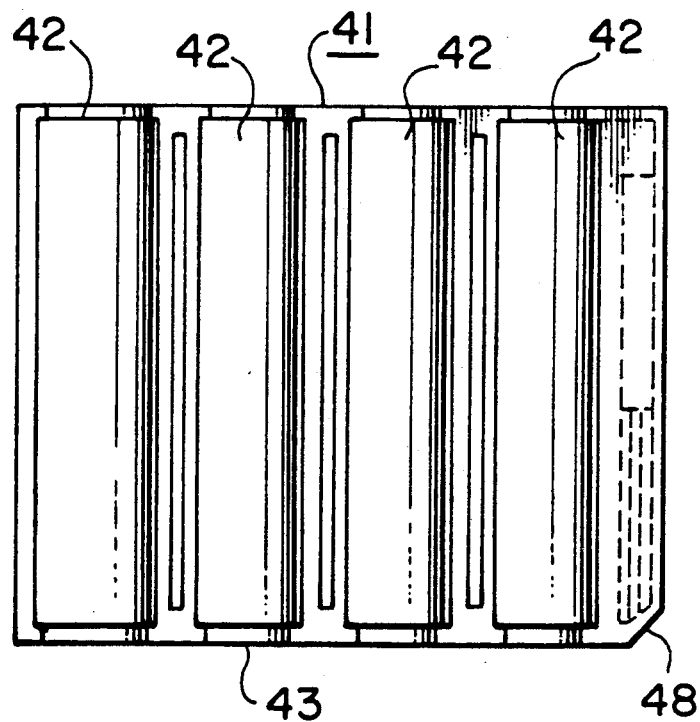
Figure 5C:
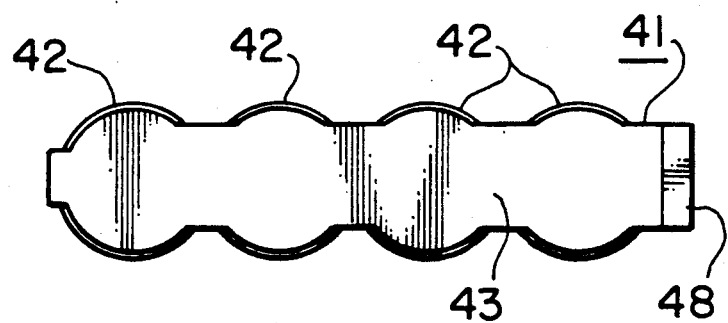
Figure 5D:
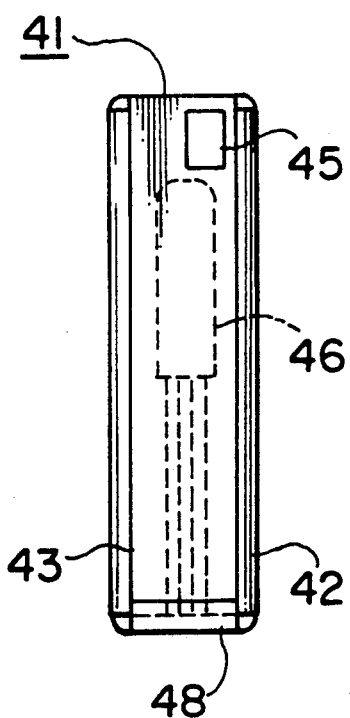
Figure 6:
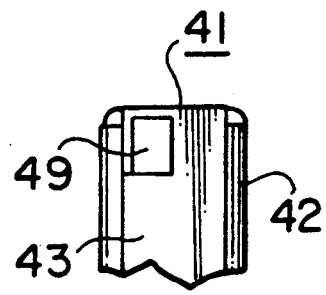
FIG. 6 is a side view showing a principal portion of another example of battery packs.

FIGS. 2 to 4 are drawings showing a battery case in accordance with an embodiment of the present invention, in which FIG. 2 is a plan view showing the state where an upper case is removed, FIG. 3 is a sectional view taken along the line III—III in FIG. 2 and FIG. 4 is a perspective view showing plus terminals for a battery pack. FIGS. 5A to 5D show an example of battery packs, in which FIG. 5A is a plan view, FIG. 5B is a front view, FIG. 5C is a bottom view, and FIG. 5D is a side view. FIG. 6 is a side view showing a principal portion of another example of battery packs.

The battery pack 41 shown in FIGS. 5A to 5D is described below. Four cylindrical secondary batteries 42 are packed in a synthetic resin case 43. A charging minus terminal 44 is provided at a position corresponding to the end surface of the secondary battery 42 at one lateral end of the pack 41, and a charging plus terminal 45 and a thermal protector 46 which is operated during short circuit are provided at positions at the side of the secondary battery 42 at the other lateral end of the pack 41, which positions are near the end surface of the pack 41 on the side of the minus terminal 44. Recessed portions 47 are formed at positions corresponding to the end surfaces of the secondary batteries 42 other than the secondary battery 42, on which the minus terminal 44 is disposed, on the side of the minus terminal 44. The corner portion of the pack 41 on the side of the plus terminal 45, which corner is opposite to the plus terminal 45, is cut at an angle to form an inclined portion 48 for preventing reverse insertion.

The battery pack 41 shown in FIG. 6 has the same structure as that of the battery pack 41 shown in FIG. 5 with the exception that a charging plus terminal 49 is disposed at a position different from that of the plus terminal 45 of the battery pack 41 shown in FIG. 5. Although the position of the plus terminal 49 is the same as that of the plus terminal 45 in the axial direction of the secondary batteries 42, both plus terminals 45 and 49 are respectively disposed near the surface side and rear side of the battery pack 41.

Figure 1:
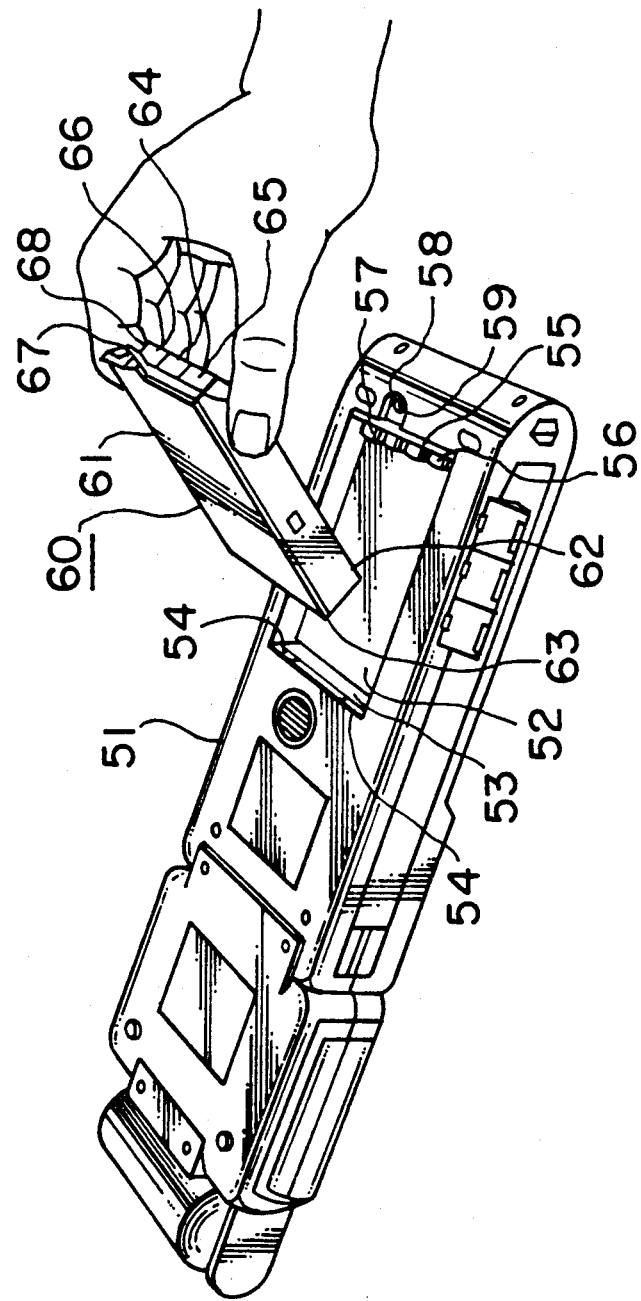
FIG. 1 is a perspective view showing the state before a storage battery is attached to the body of a portable terminal device (Prior Art)

A battery case of the present invention is described below. As shown in FIGS. 2 and 3, a case 1 comprises 9 lower case 2 and an upper case 3, the lower case 2 having an outer plate 4 and an inner plate 5 both of which are provided on one short side thereof. A recessed portion 6 is formed between the outer and inner plates 4 and 5 at an intermediate portion of the short side, and two engaging holes 7 are formed in the outer plate 4 on the open side of the recessed portion 6. An engaging protrusion 8 and an engaging hole 9 are provided at adjacent positions at either end of a side plate on the other short side of the lower case 2 on the opening side thereof. A connecting protrusion 10 is provided on the outside of the outer plate 4 at the central portion thereof on the opening side, and an attaching screw 11 is supported by being passed through a screw through hole of the connecting protrusion 10. A support piece 12 is provided on a portion of one short side of the upper case 3 in the direction at right angles to the surface thereof, a flexible piece 13 being connected to the support piece 12 so as to be bent toward the surface side. Two engaging protrusions 14 are provided at the end of the flexible piece 13 so as to respectively engage with the engaging holes 7. The upper case 3 has engaging protrusions 16 which are provided on the side plate 15 on the other short side thereof so as to be respectively inserted into the engaging holes 9. The engaging protrusions 16 of the upper case 3 are respectively inserted into the engaging holes 9 of the lower case 2, the support piece 12 and the flexible piece 13 of the upper case 3 are forced to be inserted into the recessed portions 6 of the lower case 2 by virtue of the elastic deformation of the flexible piece 13, and the engaging protrusions 14 are respectively engaged with the engaging holes 7 by virtue of the impact resilience of the flexible piece 13 so that the upper case 3 is fixed to the lower case 2. The thus-assembled case 1 has a storage space 17 formed therein so that a plurality (four batteries in the example shown in the drawings) of primary) batteries (not shown) or the battery pack 41 in place of the primary batteries can be accommodated therein. The case 1 has the same external shape as that of the case 61 of the storage battery 60 shown in FIG. 1. Each of the engaging protrusions 8 and 16 is formed into the same shape as that of each engaging protrusion 63 of the case 60, and the connecting protrusion 10 is formed into the same shape as that of the connecting protrusion 67 of the case 60. Namely, the case 1 has the attaching means formed in the same manner as that for the storage battery 60 so that the case 1 can be attached to the recessed portion 52 of the portable terminal device (referred to as "body") 51 shown in FIG. 1.

The lower case 2 has coil spring-like minus terminals 19 which are supported at four position on the inside of the side plate 18 on one long side thereof, and linear plus terminals 21 which are respectively supported corresponding to the minus terminals 19 on the inside of the side plate 20 on the other long side thereof. The minus terminal 19a at an end is used as a minus terminal for a primary battery and the minus terminal 44 for the battery pack 41. The minus terminal 19a is connected to a minus external terminal 23 through a conductive member 22 provided along the inside of the side plate 18. The plus terminal 21 opposite to the minus terminal 19a is connected to the minus terminal 19 adjacent to the minus terminal 19a through a conductive member 24. The other plus terminals 21 are in turn connected to the other minus terminals 19 through conductive members 24. Each of the conductive members 24 is supported by an insulator 25. The plus terminal 21a at the end is connected to the plus external terminal 27 provided on the outer plate 4 through a conductive member 26, and a charge preventing diode 28 is inserted into an intermediate portion of the conductive member 26. Two plus terminals 29a, 29b exclusively used for the battery pack 41 is supported by the inner plate 5. The two plus terminals 29a, 29b are disposed in a two-step form in the direction of height so as to respectively correspond to the plus terminals 45 and 49 of the battery pack 41. The contact portion of each of the plus terminal 29a, 29b is inwardly projected from the inner plate 5, and the base portion thereof is connected, through a conductie member 30, to the plus external terminal 31 provided on the outer plate 4. The charge preventing diode 28, the conductive member 30 and so on are protected by the cover 32 provided between the upper portions of the outer plate 4 and the inner plate 5. The minus external terminal 23 and the plus external terminals 27, 31 are provided so as to respectively contact with the minus terminal 56 and the two plus terminals 57 at the same positions as those of the minus terminal 65 and the plus terminal 66 of the storage battery 60, i.e., in the state where the case 1 is attached to the recessed portion 52 of the body 51. The case 1 has an inclined portion 33 for preventing reverse insertion which is projected at the corner portion of the storage space 17 on the side on the plus terminal 21a.

The procedure for using the case configured as described above is described below.

When primary batteries are used, four primary batteries (not shown) are inserted into the lower case 2 shown in FIG. 2 so that the minus and plus terminals of the batteries respectively contact with the corresponding minus and plus terminals 19 and 21. The upper case 3 is then secured to the lower case 2 by the above-described method. The engaging protrusions 8 and 16 are respectively engaged with the engaging holes 54 on the side of the body 51 shown in FIG. 1. The case 1 is then rotated around the engagement portion serving as a fulcrum so that the case 1 is accommodated in the recessed portion 52 on the side of the body 51, and the connecting protrusion 10 is engaged with the connecting recessed portion 58. This brings about the contact of the minus external terminal 23 and the plus external terminals 27, 31 with the minus terminal 56 and the two plus terminals 57 on the side of the body 51. The attaching screw 11 supported in the through hole of the connecting protrusion 10 is then screwed into the screw hole 59 on the side of the body 51 so that the case 1 can be attached to the body 51. This enables the use of the primary batteries as a power source by employing the minus and plus external terminals 23 and 27.

Conversely, the attaching screw 11 is loosened, and the case 1 is rotated around the engagement portion between the engaging protrusions 8, 16 and the engaging holes 54, which portion serves as a fulcrum, so that the connecting protrusion 10 of the case 1 is separated from the recessed portion on the side of the body 51. The engaging protrusions 8, 16 are then separated from the engaging holes 54 so that the case 1 can be separated from the body 51.

When a battery pack 41 containing secondary batteries 42 is used, the battery pack shown in FIGS. 5A to 5D or FIG. 6 is accommodated in the lower case 2 shown in FIG. 2. The minus terminal 44 is brought into contact with the minus terminal 19a, and the plus terminal 45 or 49 is brought into contact with the plus terminal 29a or 29b. At this time, the inclined portions 48 and 33 for preventing reverse insertion are fitted to each other so as to prevent reverse insertion and cause accurate contact of the terminals, as described above. The deformation of the other minus terminals 19 is relieved by the recessed portions 47 of the battery pack 41. The engaging protrusions 8 and 16 are engaged with the engaging holes 54 on the side of the body 51 by the same way as that described above. The case 1 is rotated around the engagement portion serving as a fulcrum so that the caes 1 is accommodated in the recessed portion on the side of the body 51, and the connecting protrusion 10 is engaged with the connecting recessed portion 58. This brings about the contact of the minus external terminal 23 and the plus external terminals 27, 31 with the minus terminal 56 and the two plus terminals 57 on the side of the body 51. The attaching screw 11 supported in the screw through hole of the connecting protrusion 10 is then screwed into the screw hole 59 on the side of the body 51 so that the case 1 can be attached to the body 51. This enables the secondary batteries 42 to be used as a power source by employing the minus external terminal 23 and the plus external terminal 31.

Since the operation of separating the case 1 is the same as that described above, the separating operation is not described below.

The above embodiment permits three types of batteries including a primary battery and two types of battery packs 41 to be used as a power source and thus the total four types of batteries further including the storage battery 60 used in conventional cases to be used as a power source.

As described above, in the present invention, primary batteries or a battery pack containing secondary batteries is selectively accommodated in the storage space of the case so as to be used as a power source by employing the minus and plus external terminals which are respectively connected to minus and plus terminals corresponding to the batteries. In addition, since the minus and plus external terminals are respectively disposed at the same positions as those of the minus and plus external terminals of a case of a storage battery, the battery case can be selectively used. Since the invention thus enables the storage battery or primary batteries to be selectively used, attempt can be made to make the use of an electronic apparatus convenient.

What is claimed is:

1. A battery case for an electronic apparatus including a body having a space into which a storage battery case having first attaching means for attaching said storage battery case to said space can be received and attached, comprising:

a case body including a space formed for selectively accommodating either a battery pack or a plurality of primary batteries, said case body having an outside dimension substantially identical with an outside dimension of said storage battery case, second attaching means provided on said case body for attaching said case body to the body of said electronic apparatus, said second attaching means being so formed as to be substantially identical with said first attaching means of said storage battery case, minus terminals and plus terminals for said primary batteries, which are arranged in said case body, for electrically connecting said primary batteries when said primary batteries are received in said space in said case body, said minus terminals including a common minus terminal for contacting a minus terminal of one of said primary batteries when said primary batteries are received in sad space of said case body and for contacting a minus terminal of said battery pack when said battery pack is received in said space of said case body, a plus terminal for said battery pack, which is arranged in said case body, for contacting a plus terminal of said battery pack when said battery pack is received in said space of said case body, a minus external terminal connected to said common minus terminal, a plus external terminal for said primary batteries which is connected to said plus terminal for said primary batteries, and a plus external terminal for said battery pack which is connected to said plus terminal for said battery pack, said minus external terminal and said plus external terminal being provided in positions adapted to be substantially identical with those of corresponding minus and plus external terminals provided on said storage battery case when said storage battery case is received in said space in said electronic apparatus.

2. A battery case as in claim 1, wherein an orientation direction of said primary batteries when said primary batteries are received in said battery case is parallel to an orientation direction of batteries contained in said battery pack when said battery pack is received in said battery case.

3. A battery case as in claim 1, further comprising a plurality of plus terminals for said battery pack which are arranged in said case body, whereby when said battery pack is received in said space of said case body, said plus terminal of said battery pack selectively contacts one of said plus terminals for said battery pack, and whereby different plus terminals are provided in said battery case for different kinds of battery packs.

4. A battery case as in claim 1, further comprising charge preventing means for preventing a charging current from charging said primary batteries when said primary batteries are received in said battery case, said charge preventing means comprising a diode electrically connected in series between said plus terminal for said primary batteries and said plus external terminal for said primary batteries and oriented so as to prevent current from flowing from said plus external terminal for said primary batteries to said plus terminal for said primary batteries.

* * * * *